United States Patent [19]

Pisharody et al.

[11] Patent Number: 5,075,280
[45] Date of Patent: Dec. 24, 1991

[54] THIN FILM MAGNETIC HEAD WITH IMPROVED FLUX CONCENTRATION FOR HIGH DENSITY RECORDING/PLAYBACK UTILIZING SUPERCONDUCTORS

[75] Inventors: Raghavan K. Pisharody, Palo Alto; Sidney D. Miller, Mountain View; Beverley R. Gooch, Sunnyvale; David A. Petersen, Berkeley, all of Calif.

[73] Assignee: Ampex Corporation, Redwood City, Calif.

[21] Appl. No.: 265,620

[22] Filed: Nov. 1, 1988

[51] Int. Cl.$^5$ .................... G11B 5/23; G11B 5/187
[52] U.S. Cl. .................... 505/1; 360/119; 360/126; 360/129
[58] Field of Search .......... 360/119, 125, 126, 120, 360/129; 505/701

[56] References Cited

U.S. PATENT DOCUMENTS

| | | |
|---|---|---|
| 2,914,735 | 11/1959 | Young . |
| 2,966,647 | 12/1960 | Lentz .................... 338/32 S |
| 3,098,181 | 7/1963 | Cioffi . |
| 3,156,850 | 11/1964 | Walters . |
| 3,185,900 | 5/1965 | Jaccarino et al. . |
| 3,187,229 | 6/1965 | Kunzler . |
| 3,234,435 | 2/1966 | Hempstead . |
| 3,245,020 | 4/1966 | Lentz .................... 338/32 S |
| 3,253,193 | 5/1966 | Lubell et al. . |
| 3,361,940 | 1/1968 | Culver et al. .................... 361/141 |
| 3,370,258 | 2/1968 | Williams .................... 335/216 |
| 3,378,691 | 4/1968 | Schwartz .................... 307/91 |
| 3,384,809 | 5/1968 | Meyerhoff et al. .................... 307/306 |
| 4,927,804 | 5/1990 | Zieren et al. .................... 360/127 |
| 4,937,227 | 6/1990 | Enz et al. .................... 360/126 |

FOREIGN PATENT DOCUMENTS

| | | |
|---|---|---|
| 0120221 | 7/1982 | Japan . |
| 60-151315 | 8/1985 | Japan . |
| 0249983 | 10/1988 | Japan . |
| 0253509 | 10/1988 | Japan . |
| 0259817 | 10/1988 | Japan . |
| 0263620 | 10/1988 | Japan . |
| 941592 | 11/1963 | United Kingdom . |

OTHER PUBLICATIONS

"Characteristics and A New Application of High-Field Superconductors", Paul S. Swartz et al., *J. App. Phys.*, vol. 33, No. 7 (Jul. 1962).

"Magnetic Shielding by Superconducting Films", R. J. Oakes, *J. App. Phys.*, vol. 33, No. 1 (Jan. 1962).

*Primary Examiner*—David J. Severin
*Attorney, Agent, or Firm*—Elizabeth E. Strnad; George B. Almeida

[57] ABSTRACT

Structures of magnetic heads having superconducting shields are disclosed for spatially directing magnetic recording/playback fields. One embodiment is a thin film magnetic head with a layer of superconductor material associated with its throat. Further embodiments provide intertrack shielding and concentration of recording/playback fields into relatively small pole tip regions.

6 Claims, 7 Drawing Sheets

THIN FILM MAGNETIC HEAD WITH IMPROVED FLUX CONCENTRATION FOR HIGH DENSITY RECORDING/PLAYBACK UTILIZING SUPERCONDUCTORS

BACKGROUND

The present invention relates to magnetic recording/playback heads having superconductor shields for spatially directing magnetic fields used in recording and playback operations.

a. Magnetic Heads

Magnetic heads are in wide use for the recording and/or playing back of analog or digital data stored on magnetic recording medium such as tapes or disks. Prior art recording heads typically consist of a ferromagnetic core defining a magnetic flux path which is closed except for a gap. A conductor such as a coil is electromagnetically coupled to the core. In recording, a current is passed through the conductor to produce the flux in the core and to produce a fringing field at the gap which impinges a portion of the magnetic medium immediately adjacent the gap. The fringing field locally magnetizes the medium. In playback, a magnetized region of the medium moving past the gap causes a flux change in the core. This flux change induces a current in the conductor which provides a data signal.

b. Superconductors Used In Magnetic Devices

It is known in the prior art that superconductors can exhibit useful magnetic shielding properties. For example, U.S. Pat. No. 3,361,940 to Culver et al. discloses a technique for providing a superconductive magnetic shield devoid of substantially trapped magnetic flux. The effect of superconductors on magnetic flux have been modeled and techniques of magnetic flux compression based on such models have been proposed. See Swartz et al. "Characteristics And A New Application Of High-Field Superconductors", *J. App. Phys.* Vol. 33, No. 7 (July 1962).

In the area of magnetic head design, it has been generally proposed to improve the recording and reproducing characteristics of a low temperature magnetic head by forming a gap spacer of a superconductor material between head halves. See Japanese Patent Document No. 60-154315(A) to Ogawa (Sanyo Denki K.K.)

c. Objects

It is desirable to provide magnetic heads which are capable of concentrating a greater amount of magnetic flux in a smaller region of the magnetic medium. In this way each sequential bit of recorded data will occupy less of the magnetic medium and data tracks can be placed closer to one another. In recording, as data density increases (e.g. to above 15,000 flux reversals/inch) the allowable spread of the magnetic field decreases. In playback, a smaller magnetized region of the recording medium must suffice to produce a detectable electrical signal from the head.

The application and detection of magnetic flux in small regions is achievable, in part, by reducing the size of the track width and gap of a conventional recording head. However, unless great care is given to the geometric design of the core, the fringing field can spread along the core thereby degrading performance. Moreover, reductions in size of the core can lead to significant manufacturing difficulties in achieving the required dimensional tolerances and durability. In spite of these efforts, the magnetic flux produced by such heads may be insufficiently focused to produce the desired density of data storage.

Accordingly, it is an object of the present invention to provide magnetic head structures for concentrating magnetic flux used in playback and recording.

It is another object of the present invention to increase magnetic record/playback head efficiency.

It is another object of the present invention to provide head structures for concentrating magnetic flux, which are readily manufacturable.

It is another object of the present invention to provide magnetic head structures which are more durable.

These and other objects and features will be apparent from a review of the written description and drawings of this patent document.

SUMMARY OF PREFERRED EMBODIMENTS

One preferred embodiment of the present invention is a thin film magnetic head for use with a magnetic recording medium. The magnetic recording head may include a core of ferromagnetic material deposited as two overlying thin film layers. A coil, preferably a deposited spiral of a metallic thin film, is provided for electromagnetic coupling to the core. The core defines a magnetic flux path which is closed except for a gap between generally parallel pole portions of the core. These pole portions may be disposed generally perpendicularly to a direction of motion of the recording medium. The pole portions are separated by a gap in which a layer of superconductor material is located.

The pole portions and superconductor layer of the thin film recording head define a throat portion of the head which terminates at a surface where pole tips are exposed. In operation this throat portion is adapted to be disposed adjacent to and parallel to the magnetic recording medium. The layer of superconductor material in the gap acts to exclude magnetic flux from the gap. In recording, the presence of the superconductor layer provides an infinite reluctance path in the gap which eliminates gap shunting. Similarly, in playback, the superconductor layer provides an infinite reluctance path in the gap. In contrast, conventional conductive inserts in the gap still provide a path for some flux.

The thin film magnetic recording head described above may also include layers of superconductor materials located on faces of the core pole portions opposite the gap. The thickness of the core may be reduced at the pole portions of the core. The layers of superconducting material located on faces of the pole portions facilitate the concentration of the fringing field of the head at exposed pole tips to restrict spreading of magnetization of the magnetic medium away from the gap and to reduce intertrack coupling. The structure may further include an etched planar member defining at least one channel for conducting a refrigerant in the vicinity of the throat to maintain the superconducting layers at a temperature where they exhibit the Meissner effect.

In the thin film head embodiment of the present invention, the gap and throat portion of the head may extend more than 0.001 inch in a direction generally perpendicular to the motion of the recording medium. This dimension is commonly referred to as throat height or gap depth. Since the superconductor material in the gap excludes magnetic flux from the gap, the thin film head may be formed with a throat portion which is longer than would be practical without the superconductor shield in the gap.

In another embodiment of the present invention, cores of a multi-track magnetic recording head are shielded from one another by a layer of superconductor. In this device a plurality of magnetic cores, each associated with a recording track and each having a gap in an exposed face thereof, are located adjacent one another. At least one intertrack shield of superconducting material is disposed between adjacent magnetic cores. The superconducting material shield extends to the exposed face of the cores. Such a multi-track recording head may further comprise an outer shield of superconducting material which surrounds the plurality of magnetic cores and the intertrack shields.

In another embodiment of the present invention a magnetic head for recording data on a moving magnetic medium is provided which includes pole shields made of superconductor material. Such a magnetic head may include a core having a magnetic flux path which is closed except for a gap between a leading pole portion and a trailing pole portion of the core. As used in this specification, the terminology "leading" and "trailing" refers to the position of a head structure relative to the direction of motion of the magnetic medium. For example, the pole first encountered by a particular portion of the magnetic medium is the leading pole and the last encountered by the portion of the magnetic medium is the trailing pole. The leading and trailing pole portions in the current embodiment each have exposed surfaces in generally the same plane, the surfaces being adapted for positioning adjacent the moving magnetic medium. As before, a conductor is provided for inducing a magnetic flux in the core in response to an electric current applied to the conductor. A pole shield made of superconductor material may be applied to at least the trailing portion of the core. The pole shield may have a surface generally in the plane of the exposed pole portion surface and be located between the recording medium and the bulk of the trailing pole portion except for an exposed trailing pole tip located adjacent the gap. This configuration facilitates the production of a magnetic field which is concentrated at the trailing pole tip to restrict spreading of magnetization of the magnetic medium in the direction of movement of the medium. In an alternative embodiment, a pole shield may be provided for the leading and trailing pole portions of the core of a magnetic recording head. In this embodiment surfaces of the pole portions disposed nearest the plane of the recording medium may be chamfered so that the surfaces slope away from the plane of the recording medium as distance from the gap increases. The superconductor pole shields may be located on the chamfered surfaces of the pole portion of the core. In this arrangement the chamfered surfaces of the pole portions of the core are covered by the superconductor pole shields except for narrow regions adjacent the gap, whereby the magnetic field of the head is concentrated in the narrow exposed regions of the pole portions.

BRIEF DESCRIPTION OF THE DRAWINGS

FIG. 2b is a plan view of the magnetic head of FIG. 2a.

DETAILED DESCRIPTION OF THE DRAWINGS

Figure 1A:
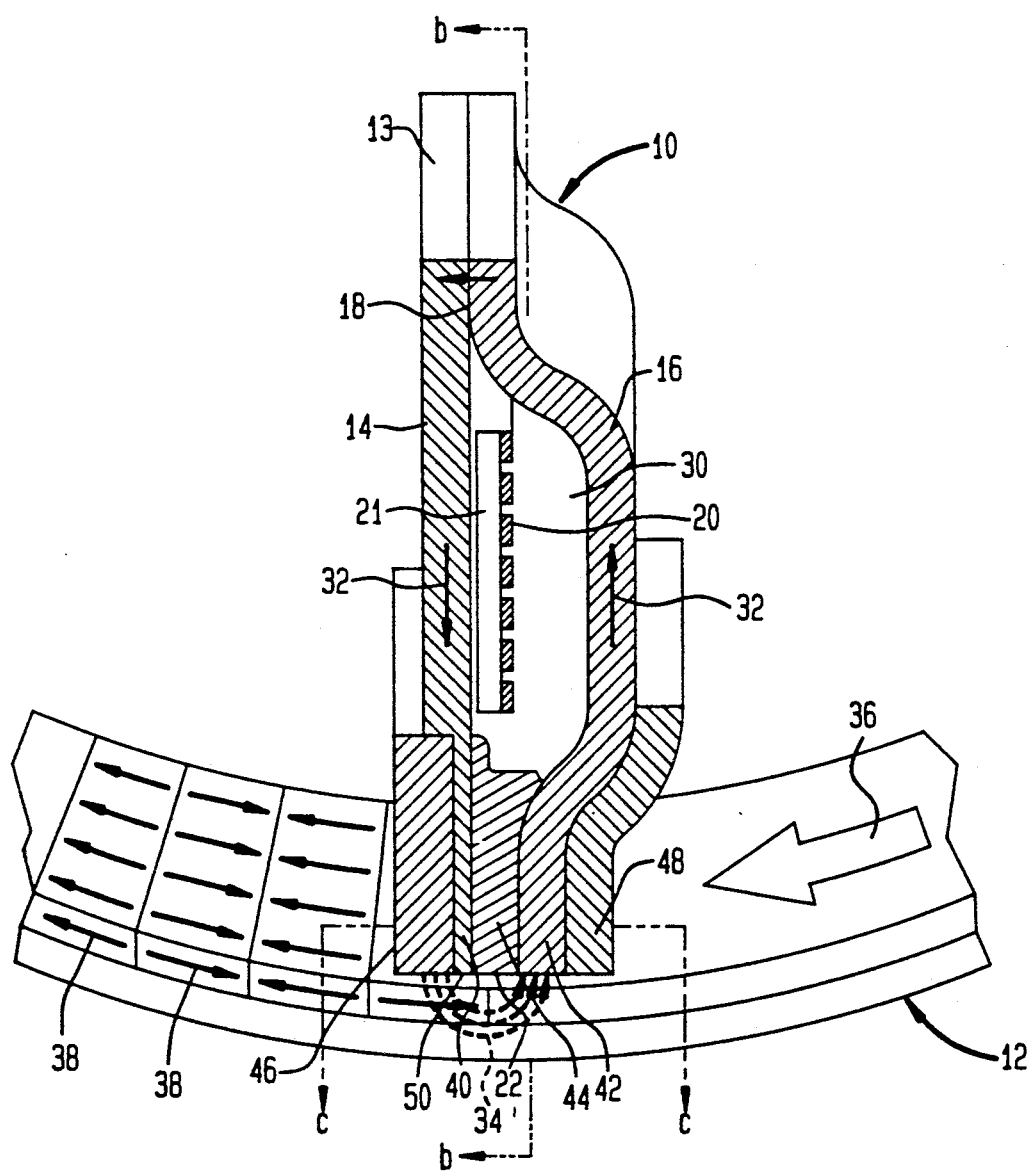
FIG. 1a is a cross-sectional perspective view of a thin film magnetic head with superconductor shielding.
Figure 1B:
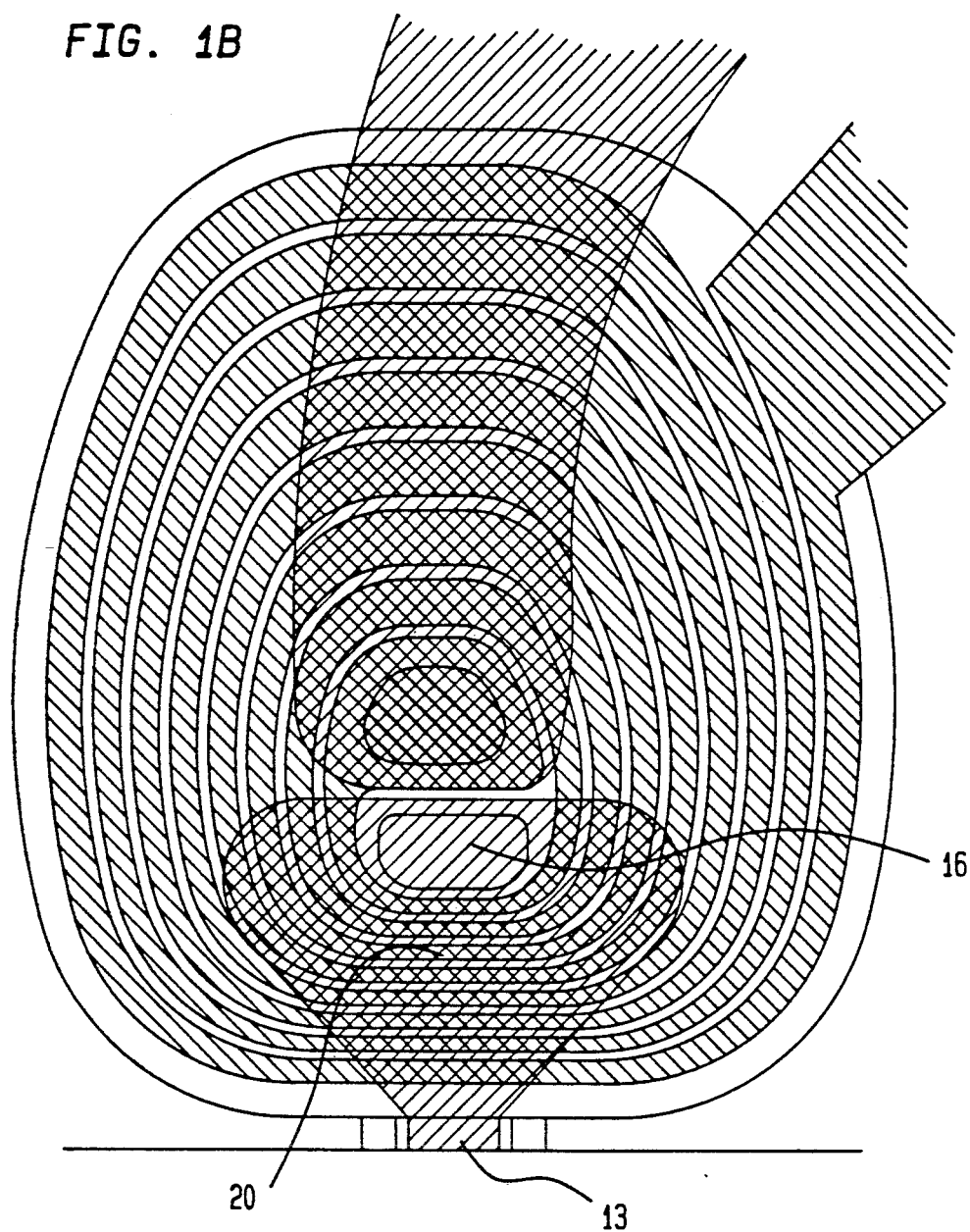
FIG. 1b is a cross-sectional view of the magnetic head of FIG. 1a taken along plane b—b.

FIG. 1a is a cross-sectional perspective view of a thin film magnetic head 10 with superconducting shielding configured in accordance with the preferred embodiment of the present invention. The magnetic head 10 has a principle plane b—b which is perpendicular to the plane of the drawing and which is perpendicular to the principle plane of a magnetic recording medium 12 such as a magnetic disk or magnetic tape. A cross-sectional view of the head taken along plane b—b is presented as FIG. 1b. FIG. 1b illustrates the arrangement of a spiral conductor used in both a prior art thin film magnetic recording head and in the thin film recording head of a preferred embodiment of the present invention. A plan view of the device of FIG. 1a, taken along plane c—c is presented as FIG. 1c.

As in the prior art, the thin film magnetic recording head has a core 13 which may consist of a first layer 14 of ferromagnetic alloy, such as permalloy, and a second layer of such material 16. These two layers may be in direct contact with the one another in the area identified by numeral 18. As one moves toward the magnetic recording medium 12, the layers 14 and 16 separate to provide a region for a conductor array or coil 20 between the layers. The conductor array or coil may be formed on a silicon or ceramic substrate 21 and may be separated from the core by organic or inorganic insulators. Moving closer yet to the magnetic recording medium 12, the layers 14 and 16 are located closer together to define a gap 22.

The structure of the prior art gap region is best illustrated with reference to FIG. 1d. As shown in that Figure, the first core layer 14 and second core layer 16 come together to define gap 22. Pole portions 24 and 26 of each of the layers of the core are separated by a non-magnetic material 23 in the gap, such as $SiO_2$ or $Al_2O_3$ and together constitute a throat portion of the head. The linear dimension of the throat in a direction perpendicular to the direction of motion of the recording medium is indicated by the dimension D in FIG. 1d. The linear dimension of the throat in a direction parallel to the motion of the recording medium is indicated by the dimension L (gap length) in FIG. 1d and is typically on the order of one micron.

In the prior art thin film magnetic recording head, the various constituent layers 14, 16, 20, 21 and 23 may be formed as thin films using conventional deposition and photolithographic technology.

In the prior art, such thin film magnetic heads have been made with narrow track widths and narrow gap lengths for applications involving high bit densities. In such applications, to optimize operation of the head, the throat depth D has been reduced to the minimum possible length, advantageously less than .001 inch. Otherwise the magnetic energy generated in the head will be largely dissipated through magnetic flux between the pole portions 24 and 26 in the gap. The reduction of the throat depth D permits a greater amount of the magnetic flux in the system to appear as a fringing flux indicated by the arrows identified by the numeral 28.

In operation in both the prior art thin film magnetic recording head and in the thin film recording head of a preferred embodiment of the present invention, data may be recorded on or played back from the magnetic recording medium 12. In recording operation an electric current may be applied to the conductor 20 in a direction generally perpendicular to the plane of FIG. 1a as indicated by the arrow head 30. This flow of current may induce a flux in the core of the recording head as indicated by arrows 32. A fringing flux 34 may be produced in the vicinity of a local region in the recording medium 12. Successive application of current to the recording head and movement of the magnetic recording medium in the direction indicated by the arrow 36 may be used to produce the pattern of magnetization in the medium as shown schematically by arrows 38. Data may be encoded in this pattern of magnetization. In playback, patterns of magnetization sequentially move past the gap 22 of the magnetic recording head. A demagnetizing field, extending above the recording medium, produces a flux in the core of the recording head and induces a voltage in the conductor 20. This induced voltage in the conductor may be employed as a signal indicative of the data encoded in the magnetic recording medium.

Figure 1C:
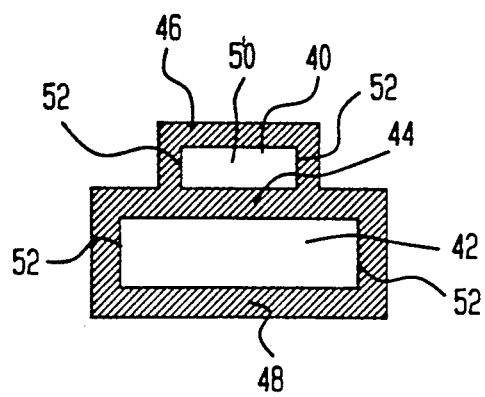
FIG. 1c is a cross-sectional view of the magnetic head of FIG. 1a taken along plane c—c.
Figure 1D:
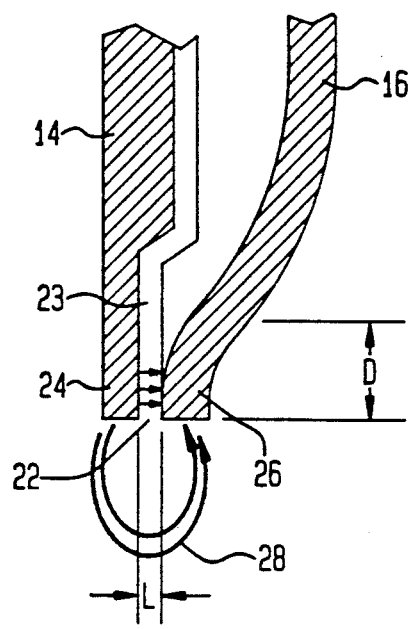
FIG. 1d is a cross-sectional view of a throat portion of a prior art thin film magnetic recording head taken along a plane perpendicular to the constituent thin film layers.

The preferred embodiment of the present invention, particularly as illustrated in FIGS. 1a, 1c and 1c, employs one or more superconductor shields to produce higher flux densities and improve the efficiency and manufacturability of the thin film magnetic recording head. As shown best in FIG. 1a the separation between the layers of core material 14 and 16 narrows in a gap region of the magnetic head defined by pole in a gap region of the magnetic head defined by pole portions 40 and 42. A layer of superconductor material 44 is located in the gap region. In a preferred embodiment of the present invention, layers of superconducting material 46 and 48 are located on faces of the pole portions 40 and 42 opposite the gap 22. In this configuration the pole portions are shielded except for their exposed surfaces or tips and the magnetic flux lines are shunted across the gap into the plane of the recording medium. Also, since the gap has an extremely high reluctance, the gap depth becomes a much less critical parameter in the efficiency of the head. Thus, since it does not have to be closely controlled in production, manufacturing yield should increase significantly. The inductance of this head will be lower than that of a typical prior art thin film head. This allows much higher signal bandwidth.

In the embodiment of FIG. 1a, the thickness of core layer 14 is reduced in the throat region of the magnetic head. This region of reduced thickness constitutes the pole portion of the core layer 14. The layer of superconducting material 46, which lies on the face of the layer 14 opposite the gap, tends to concentrate the fringing field of the head at the exposed tip 50 of the trailing pole portion 40 thereby restricting spreading of magnetization of the magnetic medium in the direction of movement of the medium.

FIG. 1c illustrates the structure of the face of the magnetic recording head of FIG. 1a. In particular, the pole portions 40 and 42 are illustrated along with the layers of superconducting shielding material 44, 46 and 48, described above. In addition, superconducting material is located adjacent to edges 52 of the pole tips. The provision of the superconductor material on the edges of the pole portions of the core tends to reduce intertrack cross-talk and to concentrate the fringing field of the magnetic head in the desired small portion of the magnetic recording medium.

In operation by virtue of the Meissner effect, magnetic flux is excluded from the gap region of the magnetic head 10 by the superconductor. Substantially all of the magnetic flux extends from the core into the medium rather than being shunted across the gap.

In one embodiment of the present invention the superconductor layers are made of a high temperature superconductor such as a yttrium barium copper oxide superconductor material which may exhibit the Meissner effect at the ambient temperature of the head without requiring direct contact with cryogenic liquified gases. As other superconductor materials are developed or discovered which have critical temperatures that are at or near ambient room temperature, it is expected that they can be employed with equal success in implementations of the present invention.

Figure 1E:
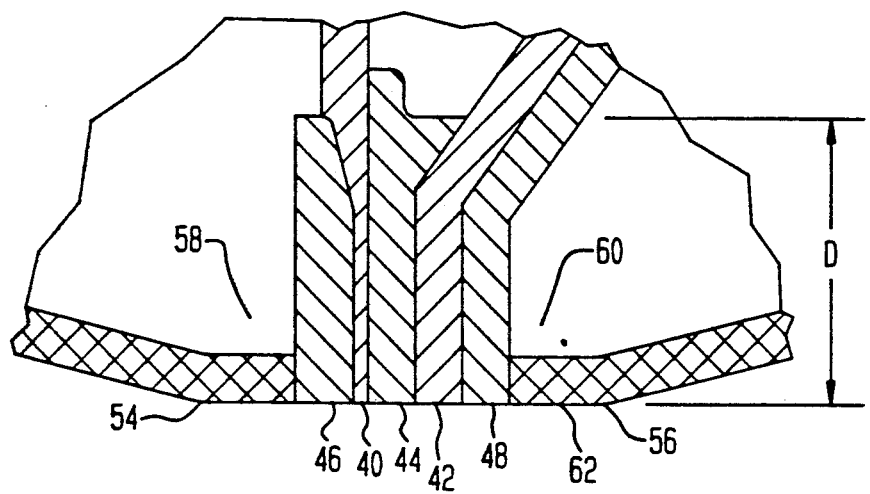
FIG. 1e is a cross-sectional view of a throat portion of a thin film head embodiment of the present invention with refrigerant channels the cross-section being taken along a plane perpendicular to the constituent thin film layers.

An alternative embodiment employing a lower temperature superconductor material is illustrated in FIG. 1e. In the Figure, the throat region of the magnetic tape head is illustrated. Adjacent the superconductor layers 46 and 48, walls 54 and 56 may be provided for confining a refrigerant. In a preferred embodiment the walls 54 and 56 are formed from layers having regions 58 and 60 etched therein. The core and superconductor shields are located between the walls 54 and 56. In operation, a cryogenic liquid may be introduced into regions 58 and 60 of the structure of FIG. 1e to maintain the superconducting layers of the head at a temperature where the superconductor materials exhibit the Meissner effect. In particular, liquid nitrogen may be supplied to the regions 58 and 60 to provide adiabatic cooling of the superconductors. Walls 54 and 56 prevent the refrigerant from contacting the recording medium.

Typically, the playback preamplifiers that are employed in magnetic reproduction machines exhibit thermal noise. Preferably, the preamplifier can be located in an area that is cooled by the cryogenic liquid, to thereby reduce the noise inherent to these devices.

Because the superconductor material layer 44 excludes magnetic field from the gap of the magnetic head, the depth of the throat D of the magnetic head is not a critical dimension. A planar surface 62 which is disposed adjacent the magnetic recording material may be formed by lapping the edge of the thin film recording head. It will be understood that the exact amount of material removed in the lapping process is not critical because the dimension D of the throat is not critical to the performance of the magnetic head of the preferred embodiment of the present invention. In addition, because a greater throat depth can be tolerated in the preferred embodiment of the present invention, it is possible to provide members 54 and 56 and channels 58 and 60 to introduce a cryogenic refrigerant in the vicinity of the gap to maintain the superconducting material at the requisite temperature.

Figure 2A:
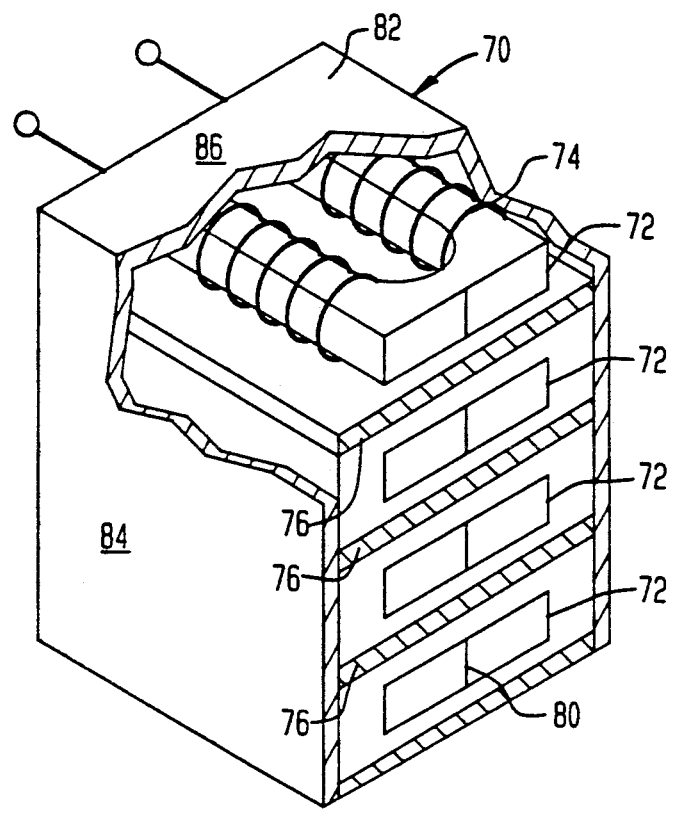
FIG. 2a is a perspective view in partial crosssection of a multi-track magnetic head with superconductor shields.
Figure 2B:
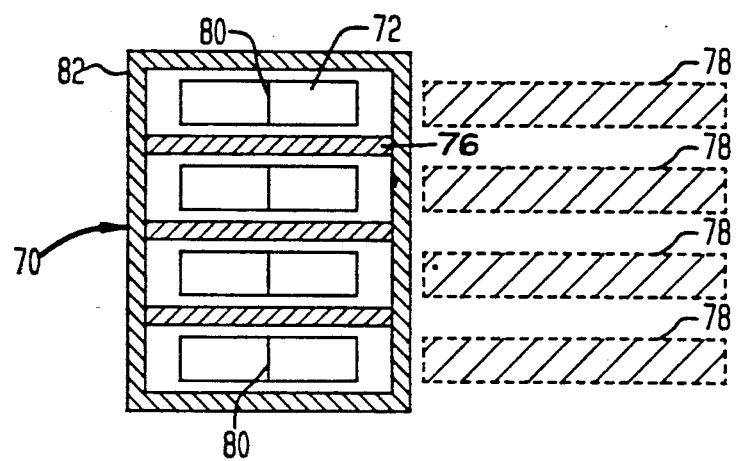

Turning now to another embodiment of the present invention, FIGS. 2a and 2b illustrate a multi-track magnetic head.

Multi-track heads are known in the prior art. In such heads a plurality of magnetic cores are arrayed adjacent one another. To reduce cross-talk caused by flux leakage (interhead coupling) in the prior art, magnetic shielding was sometimes provided between the cores. In one prior art embodiment, a copper laminated magnetic shielding was provided between the respective multi-track cores. To prevent the shields from shorting the gap flux of the cores, a nonconducting ceramic fillet was provided to separate the shield from the respective cores between which it was positioned. This prior art arrangement had the disadvantage that it did not sufficiently reduce cross-talk caused by flux leakage for all applications. In addition, the copper shields are soft in comparison to the cores and ceramic fillets used to make up the head. This in turn caused uneven machining of the head and uneven wear during use.

A multi-track magnetic head of an embodiment of the present invention is shown in FIG. 2a and denoted by the numeral 70. As in the prior art, the head consists of a plurality of magnetic cores 72 each having an electric conductor or coil 74 associated therewith. In a preferred embodiment of the present invention, adjacent cores are separated by a ceramic superconductor intertrack shield 76. These shields may be separate from the core 72 by a lanthanum titanate or similar ceramic fillet as shown in FIGS. 2a and 2b or the cores can be put in direct contact with the superconductor since the superconductor excludes the magnetic field and would therefore not short the gap flux of the cores.

A face of the magnetic recording head adapted to be disposed adjacent to the magnetic recording material is shown in plan view of FIG. 2b. Each core 72 is associated with a track illustrated schematically at numerals 78. A fringing field produced at gaps 80 of the core 72 may be used to selectively magnetize the recording material to impart data onto the tracks 78.

In operation the intertrack shields 76 exclude magnetic flux and thereby reduce cross-talk between the cores 72 of the multi-track head. This in turn permits the use of narrower tracks and, consequently, the recording of a higher density of data on the magnetic medium.

In the embodiment of the present invention shown in FIGS. 2a and 2b an outer box shield 82 of superconductor material may be provided. The shield layers 82 may be formed on surfaces such as surface 84 and surface 86 which extend away from the recording medium.

The superconductor shields employed in the device of FIGS. 2a and 2b can be fabricated in thin layers by conventional hot pressing, dicing and grinding technology used in ceramic fabrication. The heads can be assembled by alternating superconductor shield layers, ceramic spacers or shims, and the cores to form magnetic head stacks.

Figure 2C:
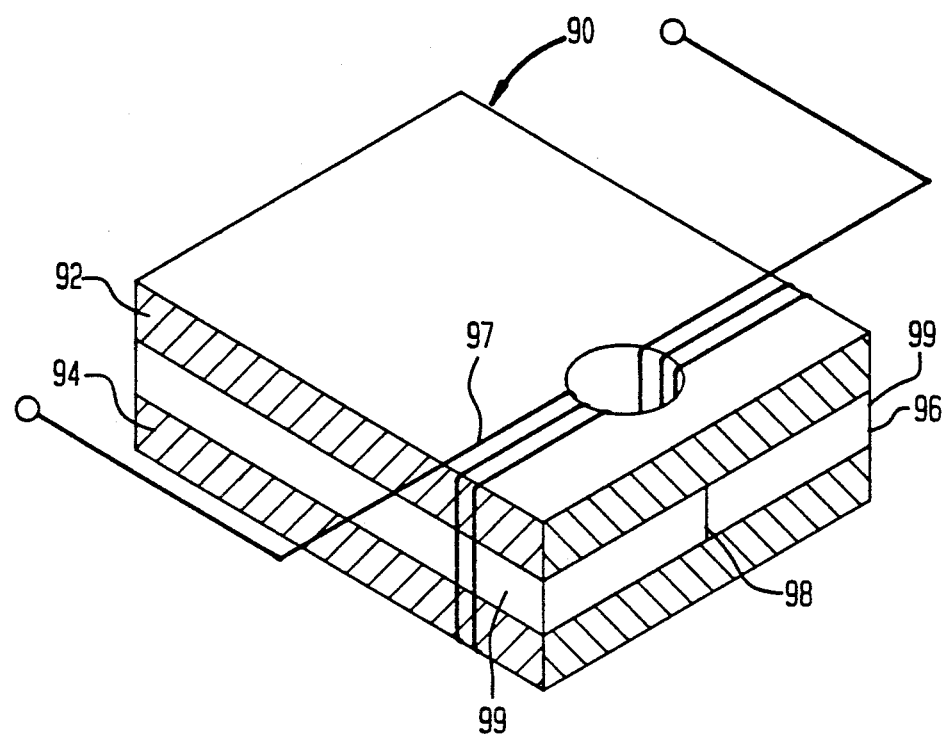
FIG. 2c is a schematic depiction of a low side leakage magnetic head.

FIG. 2c illustrates the use of shielding techniques employed in the multi-track head of FIGS. 2a and 2b in the production of a zero side reading head 90. Such a head is useful in applications where narrow, closely spaced tracks are employed. In such environments, the head may tend to pick up flux from adjacent tracks in playback operations. As shown in FIG. 2c superconductor material layers 92 and 94 are placed on either side of the core 96. A coil 97 is wrapped around core poles 99 and the associated layers of superconductor material.

The superconductor layers will reject all flux from the adjacent tracks thereby eliminating the side reading effect. In addition, the superconductor layers will reduce the leakage of flux from the head gap 98 and result in lower inductance.

Figure 3:
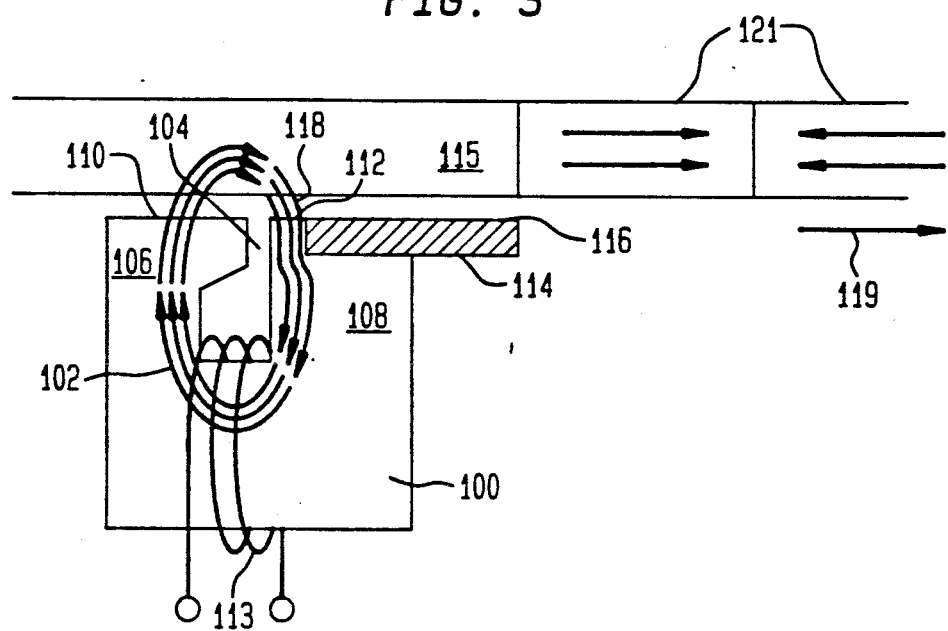
FIG. 3 is a schematic depiction of a ring head for longitudinal recording with a superconducting pole shield.

FIG. 3 depicts a ring head for longitudinal recording employing a pole shield of superconducting material in accordance with a preferred embodiment of the present invention. In this embodiment a core 100 is provided having a magnetic flux path indicated by arrows 102 which is closed except for a gap 104. The gap 104 lies between a leading pole portion 106 and a trailing pole portion 108 of the core. Each of the pole portions 106 and 108 has a surface, 110 and 112, respectively, in generally the same plane, the surfaces 110 and 112 being adapted for positioning adjacent the magnetic medium. A conductor, in the form of a coil of wire 113, is provided for inducing a magnetic flux in the core in response to an electric current applied to the conductor. A pole shield 114 made of superconductor material is provided on the trailing portion of the core. The pole shield 114 has a surface 116 which is in the plane of the pole surfaces 110 and 112. Additionally, the pole shield 114 is adapted to be located between the recording medium 115 and the bulk of the trailing pole portion 108 except for an exposed trailing pole tip 118 whose surface is indicated by the numeral 112.

In operation the magnetic field of the head is concentrated at the trailing pole tip 118 as indicated by the arrows. This restricts the spreading of magnetization of the magnetic medium in the direction of movement of the medium, indicated by arrow 119. As a result the recording field sharply decays at the trailing pole tip 118 and is capable of producing higher degree of definition between areas of magnetization 121 on the recording medium as the recording medium passes away from the head. Typically the length of the trailing pole surface 112 (i.e., its linear dimension in the direction of motion of the recording medium) may be on the order of 1-2 mils. To assure long wavelength response the corresponding length of the leading poll surface 110 may be 50 times that of the trailing pole surface 112.

Figure 4:
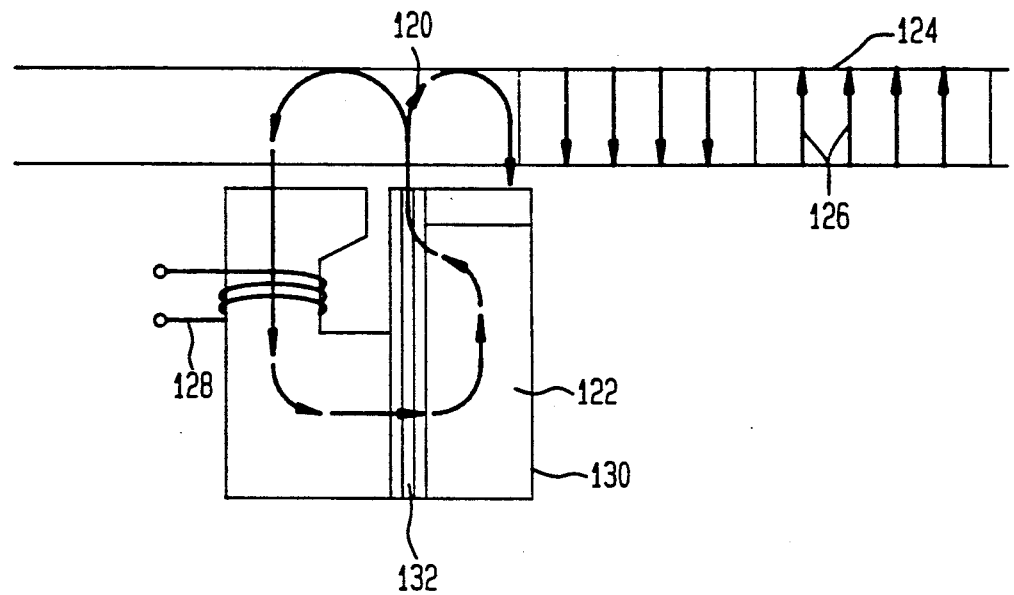
FIG. 4 is a schematic depiction of a probe magnetic head for perpendicular recording known in the prior art.

FIG. 4 illustrates a probe magnetic head known in the prior art for perpendicular recording. In perpendicular recording, a vertical recording field 120 is produced by the recording head 122. The vertical recording field impinges upon a recording medium 124 and may be employed to induce magnetization in selected regions of the recording material 124. An example of the vertical orientation of the magnetization of the recording medium is illustrated by the arrows 126 in FIG. 4.

In the prior art perpendicular recording head, a coil 128 and core 130 are employed as indicated. Between halves of the core a probe member 132 is positioned. The probe member 132 tends to concentrate the fringing field of the head outward from the face of the head into the magnetic recording medium to facilitate perpendicular recording.

Figure 5:
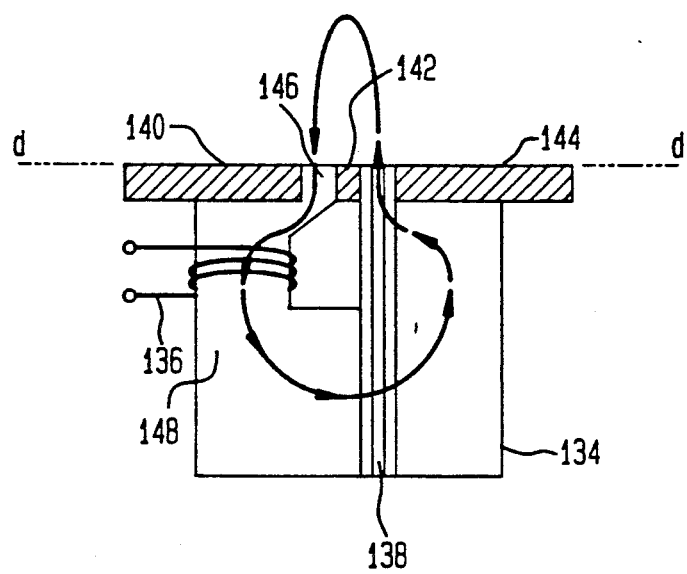
FIG. 5 is a schematic depiction of a probe magnetic head for perpendicular recording with superconductor pole shields.

In FIG. 5 a probe magnetic recording head for perpendicular recording made in accordance with the teachings of the present invention is illustrated.

In addition to a core 134, coil 136 and probe member 138, the head includes superconductor shields 140, 142 and 144 having exposed surfaces lying generally in plane d-d and adapted to be disposed adjacent the recording medium. The Meissner effect of the superconductor layers confines the head flux to the probe member 138 and to a small region 146 of the pole portion 148 of the core. This provides a substantially vertical field in the vicinity of the recording media while maintaining an efficient flux closure path.

Figure 6:
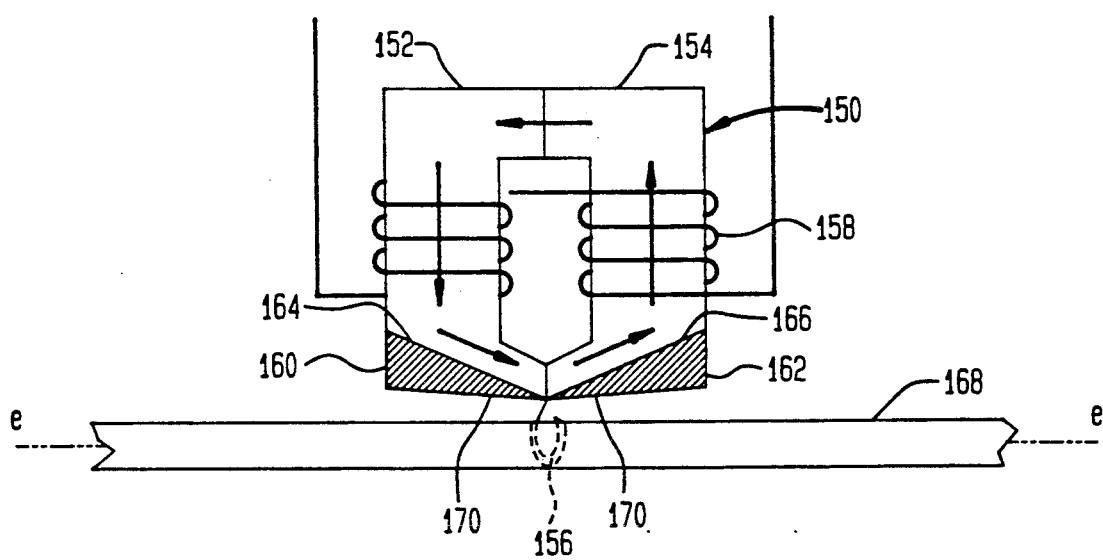
FIG. 6 is a schematic depiction of a magnetic head with superconductor shields on both poles.

FIG. 6 illustrates another embodiment of the present invention. In the embodiment of FIG. 6, as in the prior art, a magnetic head 150 for longitudinal recording includes core halves 152 and 154 separated at a gap 156 and a coil 158, electromagnetically coupled to the core. In the use of such heads in the prior art, low frequency modulations (head bumps) are sometimes encountered, which result from tape flux coupling to part of the core other than at the gap. This flux adds to the gap flux, either constructively or destructively, producing unwanted modulation.

In the embodiment of the present invention illustrated in FIG. 6, superconductor pole tips 160 and 162 are placed on the core to prevent head bumps.

Surfaces 164 and 166 of the pole halves 152 and 154 closest to the recording medium 168 are chamfered so that the surfaces slope away from the plane e—e of the recording medium as the distance from the gap 156 increases. The chamfered surfaces 164 and 166 are covered by the superconductor pole tip shield 160 and 162, respectively whose thickness decreases as one moves toward the gap. Narrow regions 170 of the pole halves 152 and 154 are exposed adjacent the gap.

In operation of the head of FIG. 6, the magnetic field of the head is concentrated in the narrow exposed regions 170 of the core, so that the tape flux is coupled to the core only at the gap area. The flux coupling to other parts of the core is virtually eliminated and a smoother low frequency response results.

While the present invention has been described and summarized by reference to various embodiments, these embodiments should be viewed as illustrative rather than restrictive. The present invention is defined in the following claims.

We claim:

1. A thin film magnetic head for use with a magnetic medium, comprising:
   a core including a first and a second deposited layer of ferromagnetic material, each layer having a pole portion, each pole portion lying in a plane generally parallel to the other and generally perpendicular to a direction of motion of the recording medium, said pole portions being separated by a gap;
   a conductor, electromagnetically coupled to said core;
   a layer of superconductor material located between the pole portions in the gap for excluding magnetic flux from the gap;
   a first layer of superconductor shield material provided on a face of the pole portion of said first layer of ferromagnetic material opposite said gap; and
   a second layer of superconductor shield material provided on a face of the pole portion of said second layer of ferromagnetic material opposite the gap.

2. The magnetic head of claim 1, further comprising layers of superconducting material located on edges of the pole portions of said core layers.

3. The magnetic head of claim 1, wherein said conductor includes a spiral of metal film deposited on an insulating substrate, at least a portion of the spiral laying between said core layers at a location where said core layers are separated a further distance from each other than at the gap.

4. The magnetic head of claim 1, wherein the thickness of one of said first and second layer of deposited ferromagnetic material forming said core is reduced at a trailing pole portion of said core, and wherein said pole portions and said first and second layer of superconductor shield material define a throat portion of said head which terminates at a surface adapted to be disposed adjacent to the magnetic recording medium, said thin film head further comprising a layer defining at least one channel for conducting a refrigerant in the vicinity of the throat portion to maintain the superconducting layer at a temperature where it exhibits the Meissner effect.

5. The magnetic head of claim 1, wherein the gap extends more than 0.001 inch in a direction generally perpendicular to a direction of motion of the recording medium.

6. The magnetic head of claim 5, wherein the pole portions and layer of superconductor material are lapped in a plane generally perpendicular to the direction of motion of the recording medium.

* * * * *